United States Patent
Olson

(10) Patent No.: US 7,617,900 B2
(45) Date of Patent: Nov. 17, 2009

(54) U-JOINT PROGRESSIVE STEERING ARRANGEMENT

(75) Inventor: Jesse W. Olson, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 248 days.

(21) Appl. No.: 11/680,487

(22) Filed: Feb. 28, 2007

(65) Prior Publication Data

US 2008/0202834 A1    Aug. 28, 2008

(51) Int. Cl.
*B62B 17/00* (2006.01)

(52) U.S. Cl. ................................... 180/190

(58) Field of Classification Search ........... 180/182, 180/190; 280/28, 21.1
See application file for complete search history.

(56) References Cited

U.S. PATENT DOCUMENTS

| | | | | |
|---|---|---|---|---|
| 1,864,041 A | * | 6/1932 | Emigh | 180/182 |
| 2,023,015 A | * | 12/1935 | Gobeil | 180/190 |
| 3,039,785 A | * | 6/1962 | Stull | 280/93.502 |
| 3,501,928 A | * | 3/1970 | Pitner | 464/134 |
| 3,815,696 A | * | 6/1974 | Larive et al. | 180/190 |
| 3,926,069 A | * | 12/1975 | Wenninger | 74/492 |
| 4,476,741 A | * | 10/1984 | Yamaguchi | 74/493 |
| 4,690,234 A | * | 9/1987 | Takada | 180/182 |
| 5,366,316 A | * | 11/1994 | Cymbal | 403/378 |
| 5,415,588 A | * | 5/1995 | Wier | 464/114 |
| 5,653,146 A | * | 8/1997 | Barton | 74/492 |
| 5,829,545 A | * | 11/1998 | Yamamoto et al. | 180/190 |
| 5,996,717 A | * | 12/1999 | Hisadomi | 180/182 |
| 6,186,267 B1 | * | 2/2001 | Hackl et al. | 180/444 |
| 6,325,724 B1 | * | 12/2001 | Sato et al. | 464/119 |
| 7,096,988 B2 | * | 8/2006 | Moriyama | 180/190 |
| 7,353,901 B2 | * | 4/2008 | Abe et al. | 180/190 |
| 2005/0104354 A1 | | 5/2005 | Yamada et al. | |
| 2008/0202280 A1 | * | 8/2008 | Olson | 74/551.3 |

FOREIGN PATENT DOCUMENTS

| | | |
|---|---|---|
| EP | 0626301 | 11/1994 |
| GB | 2359793 | 9/2001 |

* cited by examiner

*Primary Examiner*—Tony H. Winner
(74) *Attorney, Agent, or Firm*—Black, Lowe & Graham PLLC

(57) ABSTRACT

A steering system for a vehicle includes two skis turned by a handlebars gripped by a user. A shaft formed of two sections couples the handlebars to the skis. The sections are angled with respect to one another and coupled to one another by means of a U-joint oriented such that for small rotations from a straight orientation of the handlebars the U-joint transfers a greater force to the skis than for rotations between large angled orientations of a range of angled orientation of the handlebars.

15 Claims, 6 Drawing Sheets

US 7,617,900 B2

U-JOINT PROGRESSIVE STEERING ARRANGEMENT

FIELD OF THE INVENTION

This invention relates generally to steering systems and, more specifically, to steering systems for snowmobiles.

BACKGROUND OF THE INVENTION

A typical snowmobile is steered by means of handlebars controlling skis located at the forward end of the snowmobile. As with most vehicles, when the snowmobile is driven in a generally straight direction at high speeds, precise control of the steering angle is necessary in order to avoid losing control or veering wildly to one side. On the other hand, at larger steering angles, drivers typically slow down, but need greater ski movement.

In prior snowmobiles, the steering system has a single transmission ratio. Therefore, a user wishing to make a sharp turn must turn the handlebars sharply. At the same time, a user wishing to make precise changes in steering angles at high speeds may have each movement of the handlebars amplified into a large change in steering angle.

Due to the need for simplicity and lightness of weight in personal motorcraft such as snowmobiles, it is often impractical to provide power steering or like systems in order to compensate for this problem.

In view of the foregoing, it would be an advancement in the art to provide a simple lightweight steering system providing precise control at small steering angles and facilitating large changes in ski orientation at large steering angles.

SUMMARY OF THE INVENTION

A steering system for a snowmobile has two skis rotatable between a straight orientation and a range of angled orientations to maintain and change, respectively, a driving direction of the vehicle. The steering system includes a handle grippable by a user, such as handlebars. A shaft has a proximal end coupled to the handle and a distal end coupled to the skis to transfer rotational movement from the shaft to the skis.

The shaft is formed of first and second sections angled with respect to one another in a plane. The first and second sections engaging one another by means of a position-dependent force transfer linkage, preferably a universal joint ("u-joint"), oriented such that for small rotations from the straight orientation, the force transfer linkage transfers a greater force to the skis than rotations between large angled orientations of the range of angled orientations. Stated differently, at small angles relative to the straight orientation, the rotation of the skis is smaller relative to rotation of the handlebars. For movements at large angles relative to the straight orientation, the rotation of the skis is greater relative to rotation of the handlebars.

The position-dependent force transfer linkage may include first and second yokes secured to the first and second sections and first and second cross pieces extending across the first and second yokes, respectively. The first crosspiece is oriented substantially perpendicular to the plane and the second crosspiece is oriented substantially parallel to the plane when the skis are in the straight orientation.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
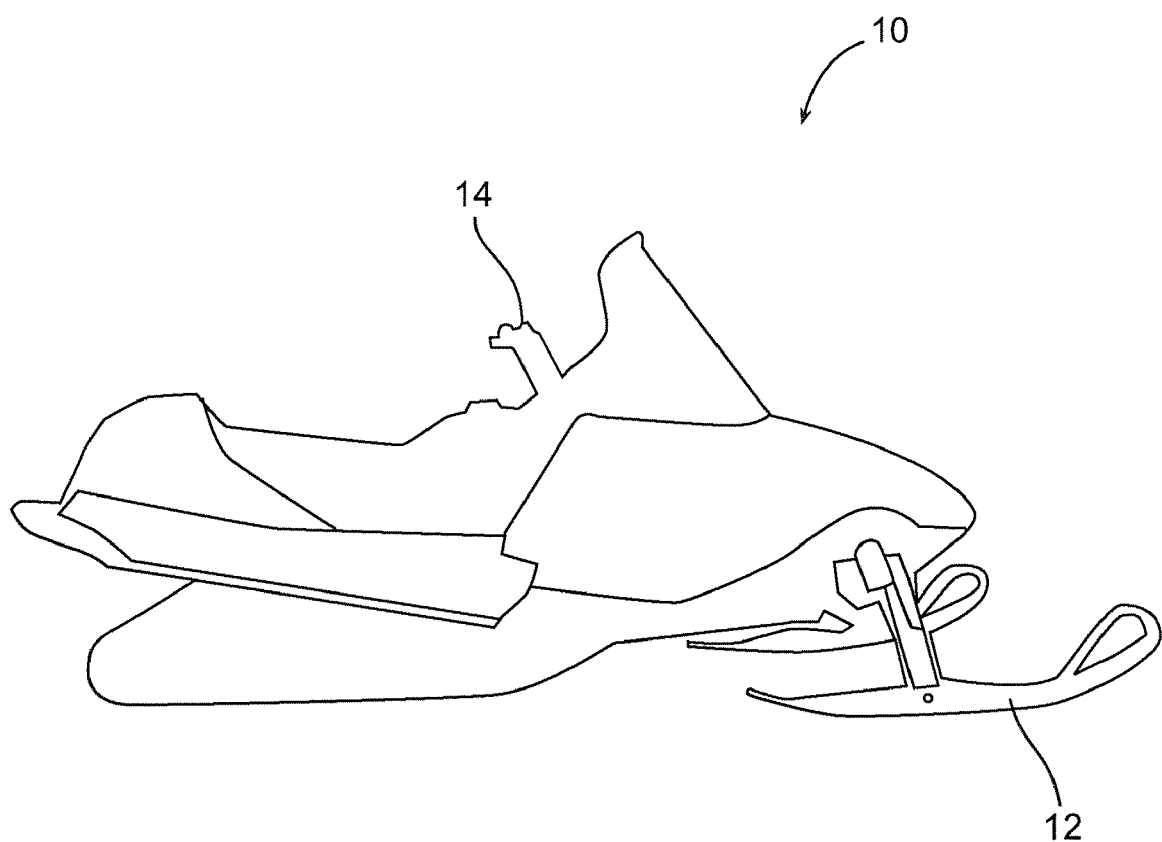
FIG. 1 is side-elevation view of a snowmobile.
Figure 2:
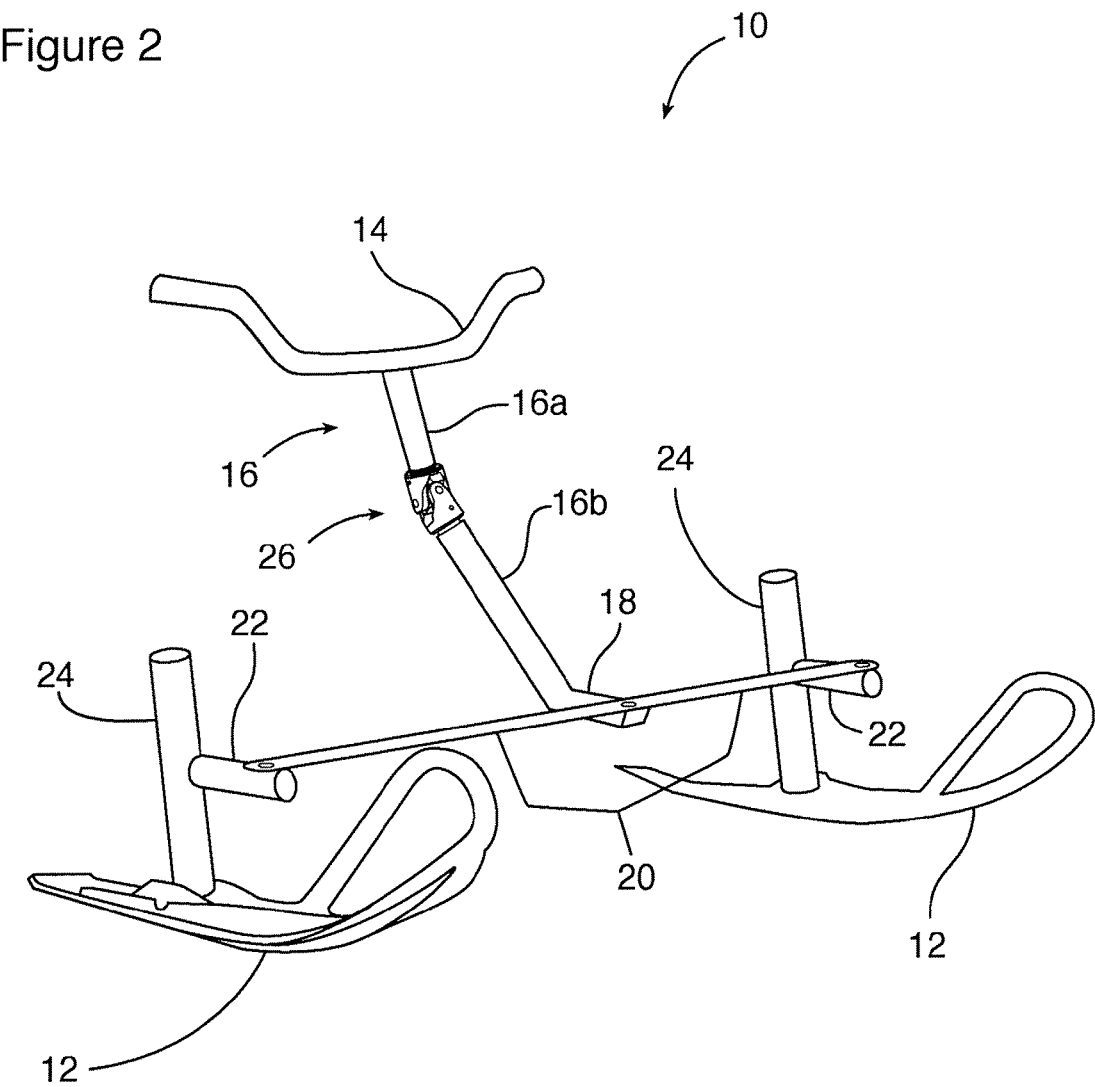
FIG. 2 is an isometric view of a steering system for a vehicle, such as a snowmobile, in accordance with an embodiment of the invention.
Figure 3:
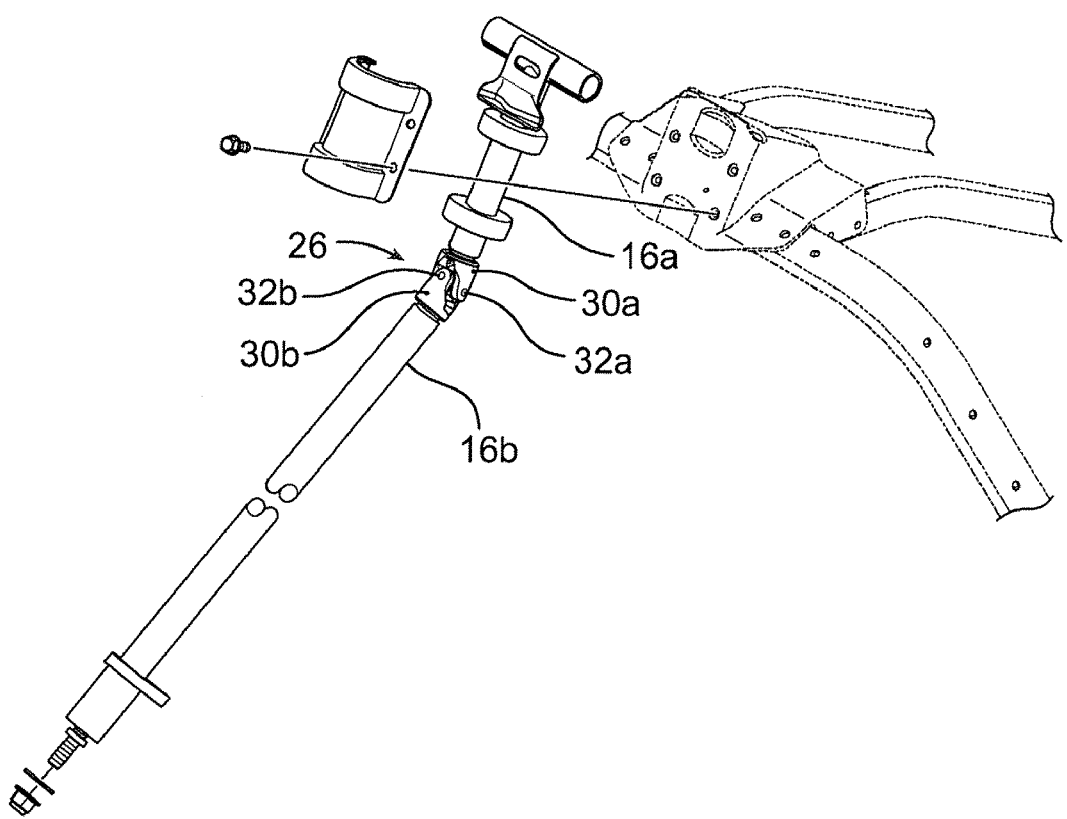
FIG. 3 is a partially exploded view of a steering shaft in accordance with an embodiment of the present invention.

Referring to FIGS. 1-3, a typical snowmobile steering system 10 includes skis 12 coupled to handlebars 14. A steering post 16 is secured to the handlebars 14 and drives an arm 18 extending transversely from the post 16. The arm 18 is pivotally secured to tie rods 20 extending to arms 22 rigidly secured to spindles 24, in turn mounted to the skis 12. In one embodiment of the invention, the steering post 16 is formed in multiple links 16a, 16b coupled to one another by a U-joint 26. The links 16a, 16b are at an angle 28 with respect to one another (see FIG. 4). In one embodiment, the angle 28 is between about 10 and 30 degrees. In another embodiment, the angle 28 is between 15 and 25 degrees. In the preferred embodiment, the angle 28 is about 20 degrees.

The angled configuration of the links 16a, 16b causes the output speed of the link 16b to vary depending on the orientation of the U-joint 26. The ratio of the speed of the output shaft 16b to the speed of the input shaft fluctuates over a 90-degree rotation.

Various embodiments of a U-joint are known in the art. A typical U-joint includes two U-portions, or yokes, 30a, 30b secured to the shafts 16a, 16b, respectively. Two crosspieces 32a, 32b extend across the ends of the U-portions 30a, 30b, such that each of the crosspieces 32a, 32b is captured between the other crosspieces 32a, 32b and one of the U-portions 30a, 30b. In some U-joints, the crosspieces 32a, 32b are secured to one another in a perpendicular arrangement (see FIG. 6).

Figure 4:
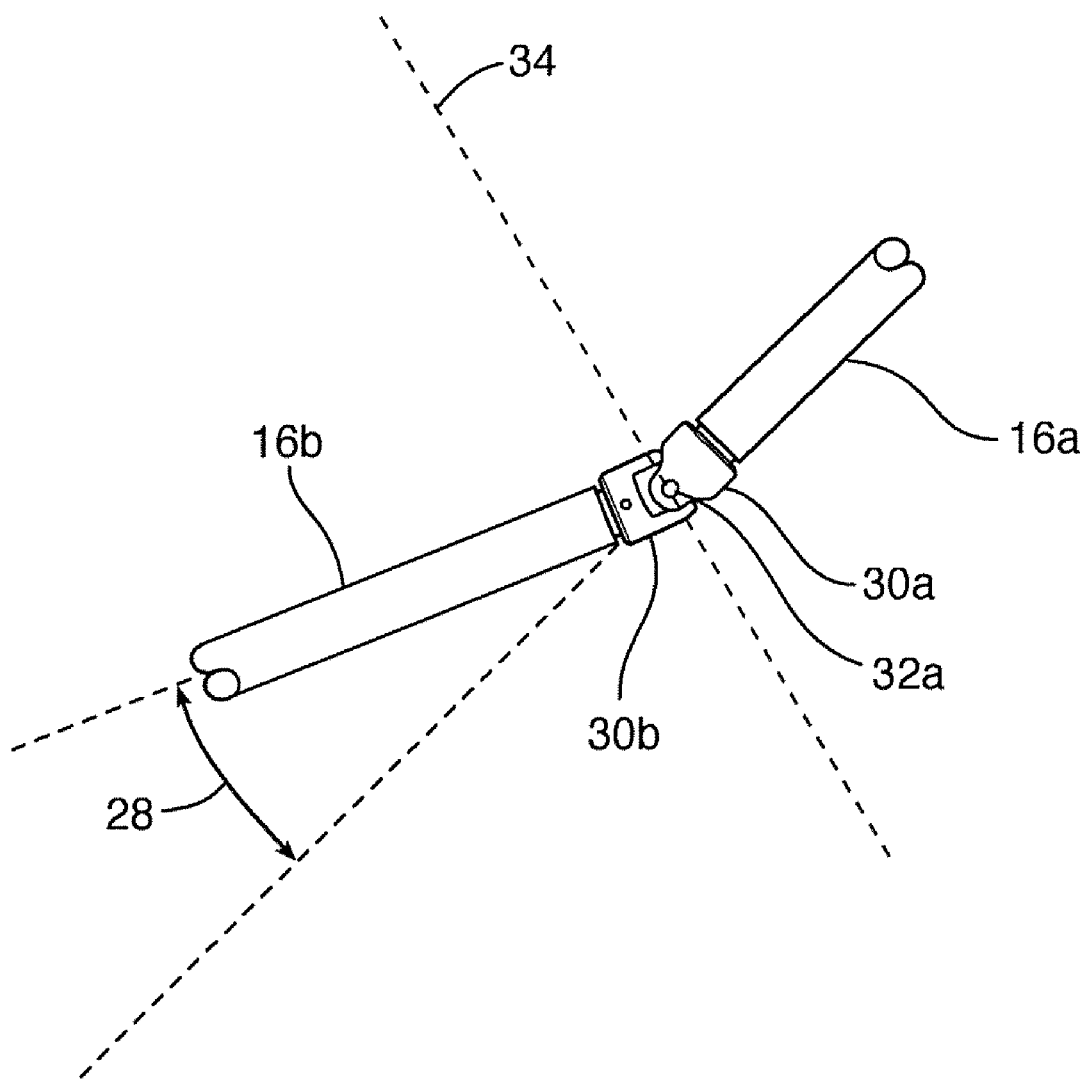
FIG. 4 is a side-elevation view of a U-joint used in a steering shaft in accordance with an embodiment of the present invention.

FIG. 4 illustrates an orientation of the crosspieces 32a, 32b and U-portions 30a, 30b resulting in a transmission ratio of less than one. As is apparent in the figure the crosspiece 32a is oriented normal to the plane, referring to the plane in which both shafts 16a, 16b lie. The crosspiece 32b is in the plane, as is best shown in FIG. 6.

Figure 5:
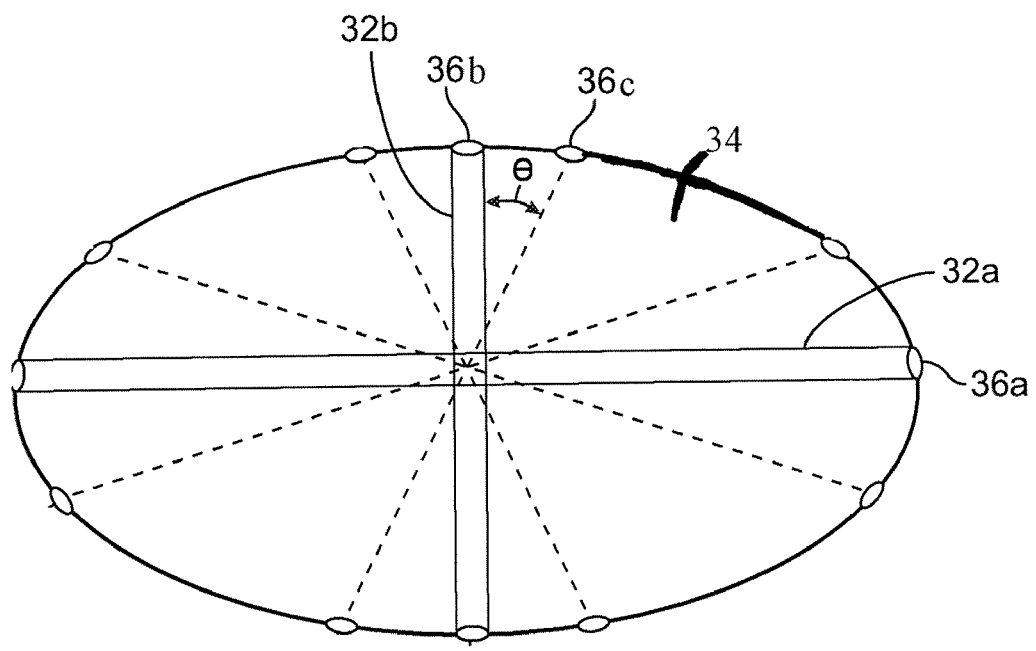
FIG. 5 is a diagram of a plane of movement of a U-joint in accordance with an embodiment of the present invention.

A plane 34 may be drawn bisecting the interior angle between the shafts 16a, 16b. FIG. 5 indicates the orientation of the crosspieces 32a, 32b projected onto the plane 34. For the orientation of FIG. 4, the crosspiece 32a is shown entirely in the plane 34 such that the length of the crosspiece 32a in the plane 34 is at its maximum in position 36a. The crosspiece 32b is at an angle with respect to the plane 34 and the projection 36b of the crosspiece 32b onto the plane 34 is less than the length of the crosspiece 32b. As the crosspieces 32a, 32b are rotated an angle θ to position 36c, the transmission ratio is varied according to the equation $$\frac{\cos\Phi}{1 - \sin^2\Phi \sin^2\theta},$$

where Φ is the value of the angle 28 (see FIG. 4). At the position of FIG. 4, the transmission ratio is at a minimum. In one embodiment of the invention, the maximum value of θ is between 45 and 65 degrees. In the preferred embodiment, the maximum value of θ is between 50 and 60 degrees. In a more preferred embodiment, the maximum value of θ is about 55 degrees.

Figure 6:
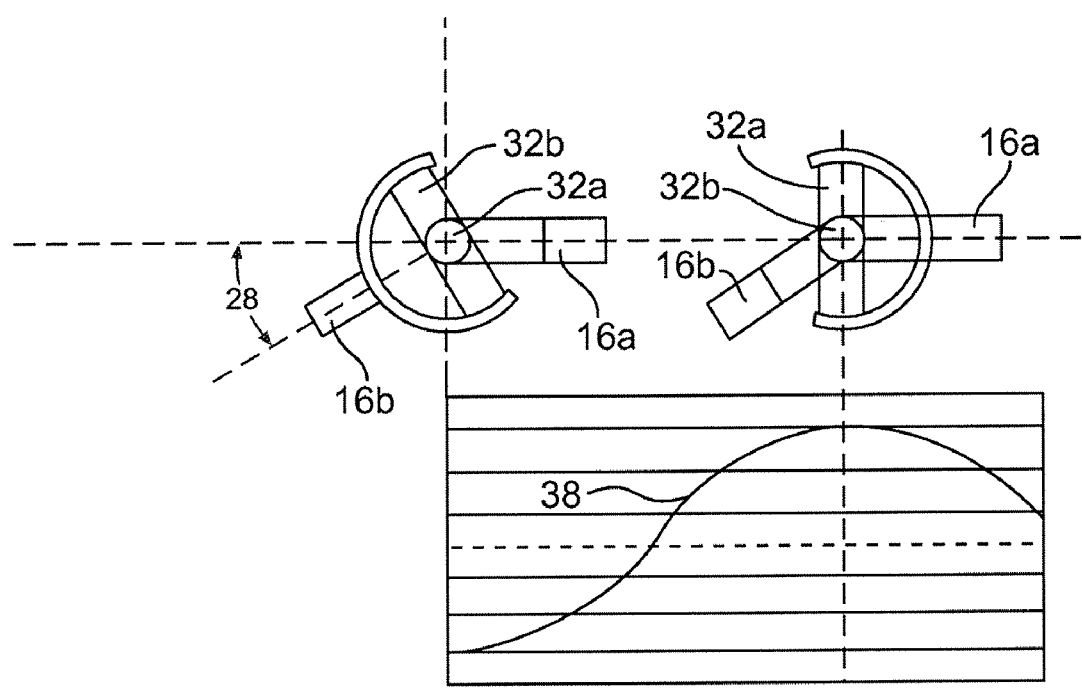
FIG. 6 is a graph illustrating the variation of the ratio of output speed to input speed with respect to steering angle.

Referring to FIG. 6, the angular velocity of the link 16b relative to a constant angular velocity of the link 16a is illustrated by the plot 38. The vertical axis represents the angular velocity of the link 16b and the horizontal axis represents the value of θ. It is readily apparent that when the crosspiece 32a is oriented into the plane of the figure, the angular velocity of the output shaft 16b is at a minimum, which means the torque exerted on the shaft 16b will be at its maximum. As the crosspiece 32a is rotated into the plane of the figure, the angular velocity of the output shaft 16b increases.

In this manner the transmission ratio of the linkage is at its lowest when the skis are straight. As the skis are angled, the transmission ratio increases. The skis of a snowmobile typically sink into their own tracks in the snow or ride within a rut formed by other snowmobiles. The novel arrangement disclosed enables a larger force to be exerted at small steering angles in order to break out of the track or rut. Furthermore, breaking out of a track or rut can cause instability. The precise movements made possible by the novel arrangement disclosed enable a driver to more readily maintain control. Precise control is also important at high speeds where small changes in ski angle can have a drastic effect on direction and stability.

Using the novel arrangement claimed, at sharp turning angles the amount the skis turn increases for the same amount of a handlebar turn. In other words, a driver may make sharp turns with reduced movement of the handlebars.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A steering system for a snowmobile having a forward end and a rearward end and two skis rotatable between a straight orientation and a range of angled orientations to maintain and change, respectively, a driving direction of the snowmobile, the steering system comprising:
    a handle grippable by a user; and
    a shaft having a proximal end coupled to the handle and a distal end coupled to the skis to transfer rotational movement from the shaft to the skis;
    wherein the shaft comprises first and second sections angled with respect to one another in a plane, the first and second sections forming an interior angle facing generally upward and forward the first and second sections engaging one another by means of a position-dependent force transfer linkage oriented such that for small rotations from the straight orientation the force transfer linkage transfers a greater force to the skis than rotations between large angled orientations of the range of angled orientations.

2. The steering system of claim 1, wherein the position-dependent force transfer linkage comprises first and second yokes secured to the first and second sections and first and second crosspieces extending across the first and second yokes, respectively, the first cross piece being oriented substantially perpendicular to the plane and the second crosspiece being substantially parallel to the plane when the skis are in the straight orientation.

3. The steering system of claim 2, wherein the first and second sections form an angle between about 30 and 10 degrees.

4. The steering system of claim 3, wherein the first and second sections form an angle between about 25 and 15 degrees.

5. The steering system of claim 4, wherein the first and second sections form an angle of about 20 degrees.

6. The steering system of claim 1, wherein the skis have a range of motion of less than about 65 degrees to either side of the straight orientation.

7. The steering system of claim 6, wherein the skis have a range of motion of about 55 degrees.

8. The steering system of claim 6, wherein the handle has a range of motion of less than 65 degrees to either side of the straight orientation.

9. The steering system of claim 8, wherein the handle has a range of motion of about 55 degrees and the skis have a range of motion of about 55 degrees.

10. The steering system of claim 1, wherein the handle comprises handlebars.

11. A method for steering a vehicle comprising:
    providing a vehicle having two skis rotatable between a straight orientation and a range of angled orientations to maintain and change, respectively, a driving direction of the vehicle, the steering system comprising:
    providing a handle grippable by a user; and
    providing a shaft having a proximal end coupled to the handle and a distal end coupled to the skis to transfer rotational movement from the shaft to the skis, the shaft comprising first and second sections angled with respect to one another in a plane, the first and second sections forming an interior angle facing generally upward and forward, first and second yokes secured to the first and second shafts and first and second crosspieces extending across the first and second yokes, respectively, the first crosspiece being oriented substantially perpendicular to the plane and the second crosspiece being substantially parallel to the plane when the skis are in the straight orientation;
    rotating the handle a first angular distance from the straight position causing the skis to rotate a second angular distance; and
    rotating the handle a third angular distance from a first position to a second position, the first and second position being substantially separated from the straight position, such that the skis rotate a fourth angular distance, the ratio of the first angular distance over the second angular distance being greater than the ratio of the third angular distance over the fourth angular distance.

12. The method of claim 11, wherein the skis have a range of motion of less than about 65 degrees to either side of the straight orientation.

13. The method of claim 12, wherein the skis have a range of motion of about 55 degrees.

14. The method of claim 12, wherein the handle has a range of motion of less than 65 degrees to either side of the straight orientation.

15. The method of claim 14, wherein the handle has a range of motion of about 55 degrees and the skis have a range of motion of about 55 degrees.

* * * * *